E. FETTER.
SELF HEALING TUBE.
APPLICATION FILED FEB. 9, 1922.

1,427,278.

Patented Aug. 29, 1922.

Inventor
Edward Fetter.

Attorney

UNITED STATES PATENT OFFICE.

EDWARD FETTER, OF BALTIMORE, MARYLAND.

SELF-HEALING TUBE.

1,427,278.  Specification of Letters Patent.  Patented Aug. 29, 1922.

Application filed February 9, 1922. Serial No. 535,195.

*To all whom it may concern:*

Be it known that I, EDWARD FETTER, a citizen of the United States of America, residing in the city of Baltimore, State of Maryland, have invented certain new and useful Improvements in Self-Healing Tubes, of which the following is a specification.

The use of puncture healing material for closing the small incisions in pneumatic tires and inner tubes has been widely discussed in the patents and in the literature relating to tires and tubes and such puncture healing material has been used in various ways though its use has never become general. Puncture healing compositions have been placed inside the tube, i. e., in the air space and the tubes have also been formed with double walls particularly over the tread and the inter wall space has been filled with puncture healing material, but this latter method of applying the puncture healing material involves the manufacture of a special tube.

The object of the present invention is to provide an inter wall space for the puncture healing material which may be caused to cover the tread of the tube but which obviates the necessity for the manufacture of a special tube. To this end I have devised a hollow tread covering for pneumatic inner tubes, which tread covering is filled with puncture healing material, the cover being adapted to be cemented to the tube over the tread and completely covering the tread. The puncture healing material being secreted between the walls of the cover is released whenever the tube is punctured entering and filling and closing the hole. Closing the holes in the walls of the tread cover would be sufficient in most instances to heal the puncture as the tread cover adheres closely to the tube but the device is further effective because in the case of punctures extending through the tread cover and the tube, the healing material will pass through the inner wall of the tread cover and fill the hole in the tube completely healing the latter as well as the former.

Such tread covers are ordinarily made of rubber and the invention further contemplates the provision of a non-elastic covering or layer of canvas or the like for the outer wall of the tread cover, which layer is applied when the tread cover is flat, i. e., presenting its shortest outer dimension so that when the cover is arched or convexed as when it is placed on the tube and the tube inflated the non-elastic outer cover or layer places the tread cover member and the sack contained therein under tension placing the material within the sack under compression so that it is forced into the holes or punctures when formed.

Figure 1:
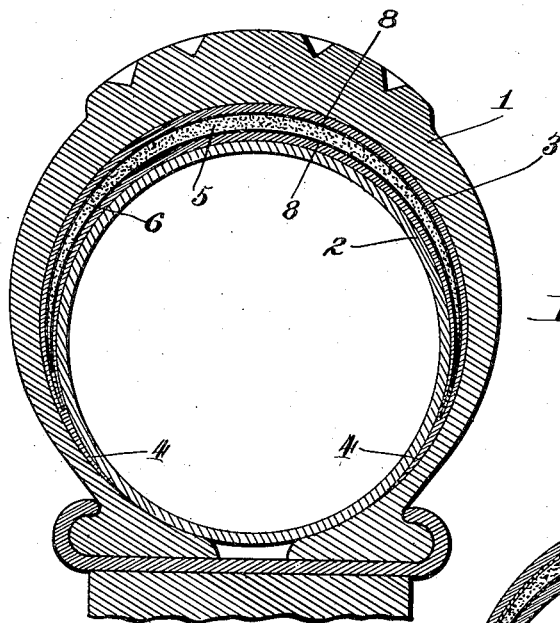
Figure 1 is a transverse section through a tire or casing and tube to which the puncture healing tread cover sack has been applied.
Figure 2:
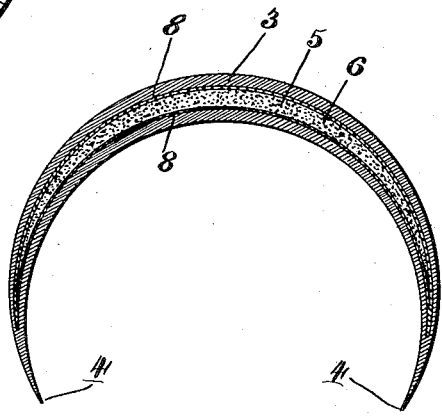
Figure 2 is a section through the sack or tread cover shown separately.

Referring to the drawings by numerals, the illustration includes the tread 1, inner tube 2 and puncture healing tread cover sack 3 covering and completely enclosing the tread portion of the tube, i. e., the tread cover sack is between the tube and the shoe or tire proper, the tread cover sack as shown is in the form of a rubber strip somewhat resembling in external appearance the old fashioned inner lining used in worn casings to protect the tube, i. e., it is of a thin crescent shape in cross section tapering to edges 4—4 at each side and containing a chamber or space overlying the tread and preferably coextensive therewith and adapted to be filled with puncture healing material 6 of any preferred composition, the inner walls of the chamber or space 5 may as in my co-pending application No. 526,229 be coated with raw rubber 8 preferaby a non-vulcanizing composition which assists in healing the punctures in that it adheres to both the rubber forming the sack and tube and to the puncture heading material within better than the puncture healing material itself adheres to the rubber forming the tube and sack. The puncture healing tread cover or tread covering sack is intended to be cemented to the tread of any tube of corresponding size covering the tread completely and healing all punctures by the entrance of the puncture healing material into the hole formed in the sack and by the entrance of the puncture healing material into punctures, if any, formed in the walls of the tube proper, the pucture healing material being first ejected through the puncture in the wall of the sack from whence it may enter the puncture in the tube. Healing may, however, in some instances be accomplished by merely closing the holes in the sack which is cemented to the tube.

Figure 3:
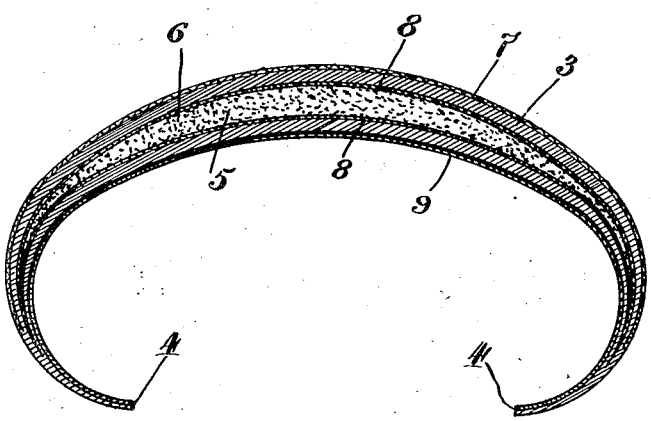
Figure 3 is a similar view shown in modified form.

The puncture healing cover or sack may be attached to the tube by the ultimate consumer or purchaser or by the retailer who would sell the tube and cover together. In the case of the ultimate consumer, the most convenient way of attaching the cover is by coating its inner surface with cement, then placing it in the shoe, likewise placing the tube in the shoe partially inflating the tube, then mounting the tire on the rim and completing the inflation of the tube. In some instances the use of cement to attach the cover may prove unnecessary. As shown in Figure 3 the sack 3 may be coated as to its inner surface which contacts the tread surface of the tube with a sheet of raw rubber 9 so that the sack is caused to adhere to the tube by merely moistening this raw rubber with gasolene and bringing the sack into engagement with the tube as foresaid.

In Figure 3 I have shown a modified form of the invention, in this instance the outer wall 6 of the sack is covered externally by a sheet of fabric 7 which is non-elastic. This is vulcanized to the rubber when the sack is in flat position. When the sack has been cemented or otherwise affixed to the tread surface of the tube, it is arched or curved by inflation of the tube, the fabric being outermost tends to stretch due to the tendency to elongate the outer wall of the sack as it bends. This tendency being resisted by the non-elastic fabric places the puncture healing fluid under pressure which pressure assists in the injection of the puncture healing material into the punctures or incisions when formed.

In addition to the advantage already specified that this tread cover may be applied to any tube, making it a puncture healing or puncture proof tube without the necessity for manufacturing a special tube, the invention has the further advantage that the puncture healing tread cover may be removed from an old tube in connection with which it has been used, the rubber having become rotted so that it is not dependable for holding air and applied to a new tube as the rubber forming the sack is not under excessive stress and is not required to hold air, merely retaining a supply of the fluid to close punctures when formed.

Having thus described a puncture healing tread covering for inner tubes in accordance with the preferred form of my invention, what I claim and desire to secure by Letters Patent is:

1. A tread cover member for inner tubes consisting of a strip of elastic material shaped to conform to the tread tapered to lateral thin edges and having an inner chamber substantially corresponding in extent to the area of the tread and puncture healing plastic material in said chamber, the inner walls of the chamber being coated with raw rubber.

2. A puncture healing cover for the treads of inner tubes of pneumatic tires consisting of a sack shaped to cover the tread and puncture healing plastic material in the sack.

3. A puncture healing cover for the treads of inner tubes of pneumatic tires consisting of a sack shaped to cover the tread and puncture healing material in the sack, the sack having a non-elastic member secured to and co-extensive with one wall which tends to compressing the material in the sack when the sack is arched into the position it would take when the tube was inflated.

4. A puncture healing cover for the treads of inner tubes of pneumatic tires consisting of a sack shaped to cover the tread and puncture healing plastic material in the sack, the surface of the sack which contacts the tread being coated with raw rubber.

Signed by me at Baltimore, Maryland, this 23rd day of January, 1922.

EDWARD FETTER.

Witnesses:
PORTER H. FLAUTT,
CARRIE M. REELY.